(12) United States Patent
Forslund et al.

(10) Patent No.: US 7,806,020 B2
(45) Date of Patent: Oct. 5, 2010

(54) INDUSTRIAL ROBOT

(75) Inventors: Karl-Erik Forslund, Västerås (SE); Annika Thyselius, legal representative, Västerås (SE); Ove Kullborg, Västerås (SE)

(73) Assignee: ABB AB, Västerås (SE)

( * ) Notice: Subject to any disclaimer, the term of this patent is extended or adjusted under 35 U.S.C. 154(b) by 521 days.

(21) Appl. No.: 10/554,787

(22) PCT Filed: Apr. 29, 2004

(86) PCT No.: PCT/SE2004/000665

§ 371 (c)(1),
(2), (4) Date: Mar. 15, 2007

(87) PCT Pub. No.: WO2004/096503

PCT Pub. Date: Nov. 11, 2004

(65) Prior Publication Data

US 2007/0256513 A1 Nov. 8, 2007

(30) Foreign Application Priority Data

Apr. 29, 2003 (SE) .................................... 0301274

(51) Int. Cl.
*B25J 17/02* (2006.01)
(52) U.S. Cl. .............. 74/490.06; 74/490.02; 74/490.03; 74/490.04; 901/23; 901/25; 901/29
(58) Field of Classification Search . 74/490.01–490.06; 901/29, 23–25
See application file for complete search history.

(56) References Cited

U.S. PATENT DOCUMENTS

| | | | | |
|---|---|---|---|---|
| 3,790,002 A | * | 2/1974 | Germond et al. | ............ 414/735 |
| 4,678,952 A | * | 7/1987 | Peterson et al. | ............... 310/83 |
| 4,692,876 A | * | 9/1987 | Tenma et al. | ................. 700/249 |
| 4,732,526 A | * | 3/1988 | Nakashima et al. | ......... 414/730 |
| 4,793,203 A | | 12/1988 | Staggl et al. | |
| 4,804,304 A | | 2/1989 | Tellden | |
| 6,477,913 B1 | * | 11/2002 | Akeel et al. | .............. 74/490.03 |
| 7,343,660 B1 | * | 3/2008 | Lemelson | .................... 29/563 |

FOREIGN PATENT DOCUMENTS

| | | |
|---|---|---|
| EP | 0648583 A1 | 4/1995 |
| EP | 0873826 A2 | 10/1998 |
| EP | 1352720 A1 | 10/2003 |
| JP | 01-157775 A | 6/1989 |
| JP | 05-318374 A | 12/1993 |
| WO | WO 9747411 A1 | 12/1997 |
| WO | WO 0025992 A1 | 5/2000 |
| WO | WO 0139933 A1 | 6/2001 |

OTHER PUBLICATIONS

Notice of Reasons for Rejection—Issued in Counterpart Patent Appln. No. 2006-508040—Aug. 24, 2009.

* cited by examiner

*Primary Examiner*—Richard W Ridley
*Assistant Examiner*—Terence Boes
(74) *Attorney, Agent, or Firm*—Venable LLP; Eric J. Franklin

(57) ABSTRACT

A robot arm for an industrial robot. The robot arm includes a wrist housing, a wrist, and a turn disc. The wrist is rotatably connected to the wrist housing and the turn disc is rotatably connected to the wrist. A first motor drives the wrist and a second motor drives the turn disc. A first driving rope transmits the motor rotation to the wrist, and a second driving rope transmits the motor rotation to the drive pulley.

17 Claims, 4 Drawing Sheets

INDUSTRIAL ROBOT

TECHNICAL FIELD

The present invention relates to an industrial robot. More precisely, the invention relates to a robot arm in such an industrial robot. The robot arm comprises a wrist housing, a wrist and a turn disc. The turn disc is rotatable relative to the centre axis of the wrist. The wrist and the rotating movements of the turn disc are driven by drive units comprised in the robot arm. In particular, the invention relates to a wrist housing that supports a wrist.

BACKGROUND ART

An industrial robot is composed of interconnected robot parts such as, for example, a stand, robot arms, an arm housing, a wrist and a turn disc. Two adjoining robot parts are connected to each other so as to be rotatable in relation to each other around an axis of rotation or are linearly displaceable in relation to each other.

An embodiment of an industrial robot according to the prior art comprises a stationary foot, which is mounted to a base. The foot supports a stand that is rotatably arranged in relation to the foot about a first axis. The stand supports a first robot arm. The first robot arm is rotatable in relation to the stand about a second axis. The first robot arm supports an arm housing. The arm housing is rotatable in relation to the first robot arm about a third axis. The arm housing supports a second robot arm. The second robot arm is rotatable in relation to the arm housing about a fourth axis, which coincides with the longitudinal axis of the second robot arm. The second robot arm comprises a wrist housing. The wrist housing supports a wrist. The wrist is rotatable in relation to the wrist housing about a fifth axis. The wrist supports a turn disc, which is rotatably arranged about a sixth axis. The turn disc comprises a toolholder. The toolholder is adapted for attachment of a tool.

The wrist housing comprises two drive units which substantially determine the dimensions of the wrist housing. The wrist housing is determined by its length and turning radius. By the length of the wrist housing is meant its extent in the longitudinal direction, parallel to the centre axis of the wrist housing. By the turning radius of the wrist housing is meant its extent perpendicular to the centre axis of the wrist housing. The space within which the robot is able to move with all physical positions is referred to as operating space.

The drive units of the wrist housing comprise electric motors. The transmission means that is present between the motor and the driven unit is designated driving rope. A driving rope thus comprises gears, chains or drive belts that transmit the motor rotation to the desired rotation around each axis of rotation. Arranging the motors for driving the rotary motions of the wrist and the turn disc inside the robot arm or in the wrist housing is a known design. The arm of an industrial robot must often pass through narrow passages and work in narrow spaces. The longer and thicker a wrist housing is, the worse will be the accessibility. It is thus desirable to limit the length and the turning radius of the wrist housing. To limit the extent of a wrist housing in space, the motor that drives the movement of the wrist is often mounted at the opposite end of the robot arm.

The motors are driven by electric current via electric cabling and are controlled via signals from signal cabling. These cablings are often disposed internally of the robot arms. The tool and the functions specific for the tool are driven and controlled via process cabling. The process cabling comprises cables for power and signals, conduits for fluids and gases, and sometimes an empty bendable protective casing, which is arranged for laying one or more conduits and cables. Process cabling transports process media, such as electricity, water and air, to the tool. Process cabling is space-demanding and stiff and is often disposed outside of the robot.

Process cabling that is disposed outside of the robot is easily subjected to impacts and extreme bending. To avoid such damage, it is desirable to dispose the process cabling inside the robot. In this way, the cables are above all protected against damage caused by squeezing. In this way, the cables are also protected from extreme twisting that may lead to rupture. At the same time, loose cables are prevented from encroaching upon the operating space. Such cables make it difficult to access and perform work in narrow spaces.

It is known that motors and gears are centrally located in the wrist housing. Motors and gears are thus located in such a way as to make it impossible to dispose the process cabling internally.

WO 97/47441 describes an industrial robot with a robot arm comprising motors. From this publication it is known to place motors in a wrist housing. The object is to achieve a tight cable entry of motor cabling to the motor that controls the wrist. However, this publication only concerns motor cabling. In addition, the motors in the wrist housing are centrally placed.

WO01/39933 describes an industrial robot with a hollow robot arm. The robot arm is rotatable around its longitudinal axis. From this publication, an internal arrangement of process cabling is known. The object is essentially to bring about a controlled cable entry to the drive pulley. However, this publication does not describe how the drive motors for the wrist and the drive pulley are placed.

EP 1128937 describes a further industrial robot with a hollow robot arm. From this publication it is known to dispose cabling internally of a robot arm. The publication also relates to a control device for controlling said cabling. The object is to protect the cabling by an internal arrangement of the cables in the robot arms. However, this publication only concerns the arrangement of cabling in the interior of a robot arm.

Thus, there is a need in industry to be able to utilize an industrial robot which has a compact wrist housing comprising drive units and which is able to work in small spaces. There is also a need in industry to be able to utilize process cabling that has a long service life and that does not encroach upon the operating space.

SUMMARY OF THE INVENTION

The object of the invention is to provide an industrial robot that has a robot arm comprising drive unit and that permits the arrangement of process cabling inside the robot arm. A further object is to provide a wrist housing that is simple and cost-effective and that is easy to install or reach or replace during servicing.

According to the invention, these objects are achieved by a robot arm, by a method, and by an industrial robot.

By placing the motors in the wrist housing eccentrically in relation to the centre axis of the wrist housing, a space is formed in which is arranged a duct for receiving process cabling. The wrist housing thus comprises a through-duct and a motor space that surrounds the channel and in which the motors are placed.

The wrist housing is rotatable about a first axis, the centre axis of the wrist housing, which coincides with the longitudinal axis of the second robot arm and is thus the same as the previously described fourth robot axis. The wrist housing is rotatable about a second axis, which coincides with the previously described fifth robot axis. The turn disc and hence the toolholder are rotatable about a third axis, which is the same as the previously described sixth robot axis. The wrist housing further comprises a first motor and a first driving rope adapted to drive the rotation of the wrist about said second axis. The wrist housing also comprises a second motor and a second driving rope adapted to drive the rotation of the turn disc about the third axis. The first motor in the wrist housing is arranged spaced from the centre of the wrist housing. The drive shaft of the first motor crosses the longitudinal axis of the robot arm. Also the second motor is arranged in the wrist housing spaced from the centre of the wrist housing. The drive shaft of the second motor crosses the longitudinal axis of the robot arm. In the wrist housing, a continuous duct is arranged between the motors. The duct is arranged essentially along the centre axis of the arm. Said duct is adapted to receive process cabling. Arranging a robot arm as described below permits process cabling to be placed centrally.

In one advantageous embodiment, the drive shaft of said first motor and the drive shaft of said second motor are arranged in planes parallel to the centre axis of the wrist housing.

In another advantageous embodiment, the drive shaft of said first motor and the drive shaft of said second motor form an angle with each other.

In a further advantageous embodiment, the drive shaft of said first motor and the drive shaft of said second motor are perpendicular to the longitudinal axis of the wrist housing.

In an additional advantageous embodiment of the invention, straight gears are used, which is made possible by a location of motors in a wrist housing according to the present invention. By a straight gear is meant a gear with cylindrical gear wheels and parallel shafts. Straight gears are easily mounted and constitute a cost-effective design. In addition, the size and the weight of the robot arm are reduced.

In yet another embodiment, the process cabling is adapted to pass through the centre of the turn disc out to the tool. The advantage of this embodiment of the invention is that the process cabling is adapted to pass through the centre of rotation of the second axis. By pulling the process cabling through the centre of rotation, the risk of rupture of the cables is reduced. If the process cabling is not pulled through the centre of rotation, stretching of the cabling arises when bending the robot arm in one direction, and compression of the cabling arises when bending in the other direction.

One advantage of the invention is that a compact wrist housing is obtained. A compact wrist housing facilitates the accessibility for a robot arm in small and narrow working spaces while at the same time the cabling does not physically encroach upon the operating space. It is thus important that the motors in the wrist housing be placed so that the dimensions of the wrist housing are minimized.

According to a preferred embodiment, the motors are placed in a common plane on both sides of the duct. With this embodiment, the length of the wrist housing is minimized. The turning radius of the wrist housing is limited by the location of the two motors. For a wrist housing designed according to the invention, this results in a physically large dimension but a reduced operating space.

According to another preferred embodiment, the motors are placed in a common plane on the same sides of the duct. Admittedly, this embodiment results in a longer wrist housing but permits the wrist housing to be optimized to operate in narrow passages.

The mechanics of a wrist housing according to the invention is arranged for the purpose of achieving a long service life and good mobility. The space in the wrist housing is limited and, in addition, the motors comprised therein require space. Motors and gears are arranged in the wrist housing in such a way as to accommodate internally disposed process cabling.

Since an industrial robot with a robot arm according to the present invention has process cabling disposed internally, such a robot has a well-defined outer contour that is simple to define graphically. An efficient simulation of such an industrial robot in a virtual computer environment is simpler to perform than of an industrial robot with a robot arm equipped with external process cabling. This is utilized, for example, to visualize stages of the operation or to control the industrial robot.

Advantageous further developments of the invention will become clear from the following description and claims.

BRIEF DESCRIPTION OF THE DRAWINGS

The invention will be explained in greater detail, by description of embodiments, with reference to the accompanying drawings, wherein.

DESCRIPTION OF THE PREFERRED EMBODIMENTS

The following description relates both to the method and to the device.

Figure 1:
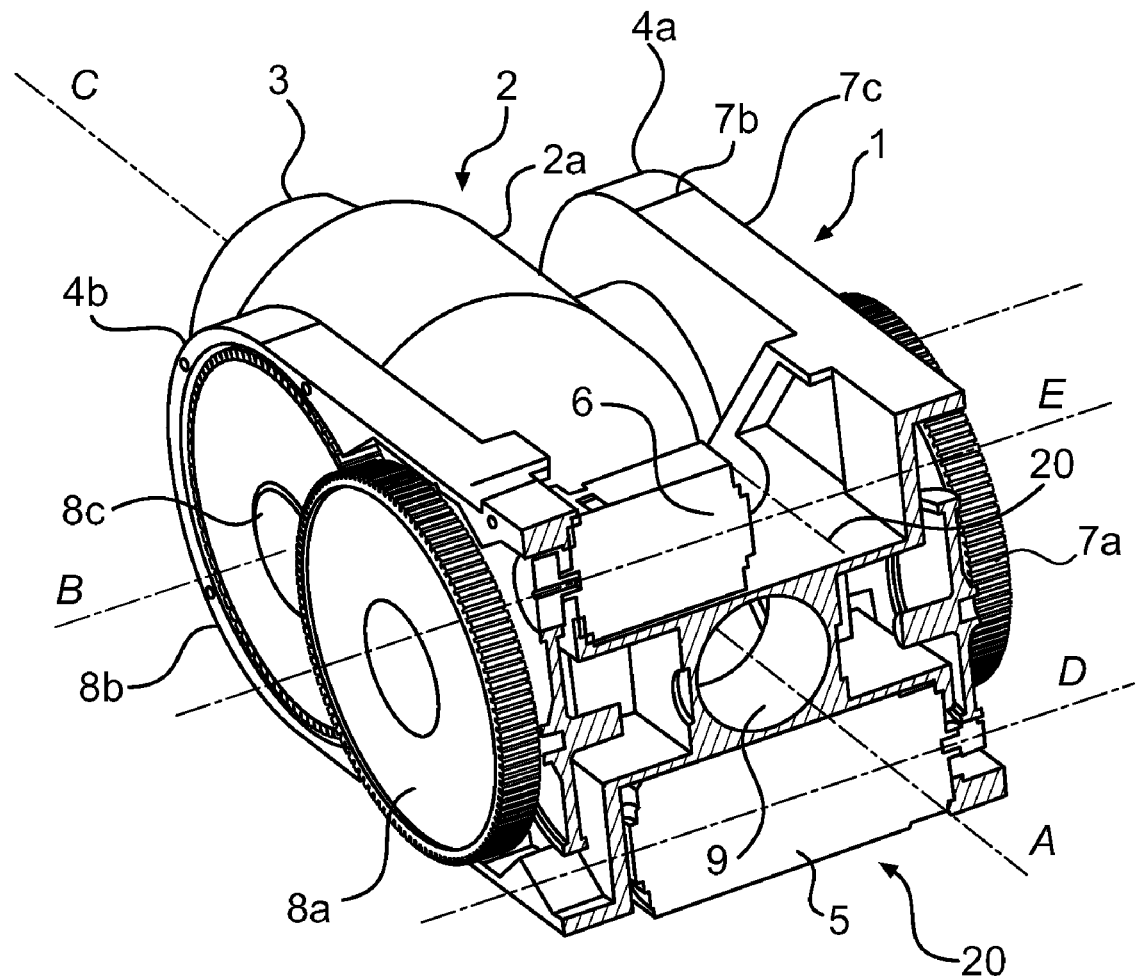
FIG. 1 is a perspective view of one embodiment of the invention.

FIG. 1 shows a perspective view of the outer part of the second robot arm of an industrial robot (not shown in its entirety) of the previously described type. The outer part of the second robot arm comprises a wrist housing 1. The wrist housing supports a wrist 2 and a turn disc 3. The wrist housing 1 comprises a fork comprising two fork elements 4a, 4b. The wrist 2 comprises a sheath part 2a comprising two lugs. The wrist is connected to the wrist housing 1 with said lugs via said fork elements. The wrist housing further comprises a first drive unit comprising a first motor 5 and a first driving rope 7, comprising a first gear means 7a, 7b and a first torque transmission member 7c. The wrist housing also comprises a second drive unit with a second motor 6 and a second driving rope 8, comprising a second gear means 8a, 8b and a second torque transmission member 8c. In addition, the wrist housing comprises a space, a through-duct 9. Said duct is intended to receive cabling. Surrounding the duct 9 is a motor space 20, in which the motors are placed.

The wrist housing is rotatable in relation to an arm housing (not shown) about a first axis A, the centre axis of the wrist housing, which coincides with the longitudinal axis of the second robot arm and is thus the same as the previously described fourth robot axis. The wrist is configured to rotate relative to the wrist housing about a second axis B, which is the same as the previously described fifth robot axis. The second axis B is oriented at right angles in relation to the first axis A. By rotation of the wrist about the second axis B, a rotation relative to the wrist housing and hence relative to the first axis A is achieved. The turn disc 3 is configured to rotate relative to the wrist about a third axis C, which is the same as the previously described sixth robot axis. The third axis C is shown in FIG. 1 in such a way that it coincides with the first axis A. However, it is to be understood that this is only one of the positions assumed by the third axis C when the wrist rotates about the second axis. By rotation of the turn disc about the third axis, a rotation of the turn disc both relative to the wrist and relative to the wrist housing is achieved. The third axis is preferably perpendicular to the first axis. Further, the turn disc is suitably so arranged that it is rotatable about the third axis in both directions, in one or more turns.

The two fork elements 4a, 4b are fixedly mounted in the wrist housing. The wrist 2 is mounted between the two fork elements 4a, 4b in the wrist housing and rotatably journalled in each of the fork elements. The wrist housing has a primary side and a slave side. In the figure, the primary side is shown facing away from the viewer and the slave side facing the viewer. The wrist is rotated by torque transmission from the first motor 5 via the first gear means 7a, 7b to the first torque transmission member 7c of the wrist housing. The first gear means is arranged on the primary side of the wrist housing. The turn disc is adapted for attachment of a tool to the toolholder. The toolholder is thus rotatable between different positions by torque transmission from the second motor 6 via the second gear means 8a, 8b to the second torque transmission member 8c of the wrist housing. The second gear means is arranged on the slave side of the wrist housing. The torque transmission members are arranged in a manner known within the technical field. The motors are chosen, for example as in this case, as ordinary compact servo motors. The first gear means is in this case a toothed gearing. Also the second gear means is in this case a toothed gearing.

The end of the wrist housing shown in FIG. 1, which end is opposite to the wrist housing and is intended to be mounted to a robot arm, forms a rectangle with the primary side and the slave side of the wrist housing as two sides. The primary side and the slave side then interconnect the other two sides of said rectangle, here referred to as a first and a second side. The first motor is placed at that end of the wrist housing that is opposite to the wrist. The first motor is arranged at a distance to the centre of the wrist housing towards the first side of said rectangle, with the drive shaft D of the motor at right angles to the first axis A. Also the second motor is arranged at a distance from the centre of the wrist housing, but instead towards the second side of said rectangle, with the drive shaft E of the motor at right angles to the first axis A through the wrist housing. Long and narrow motors are utilized. A compact motor that is so short that it is possible to place the motor with the drive shaft crossing the axis of rotation of the robot arm, while at the same time the motor in its entirety is housed within the wrist housing, is utilized. By the above-mentioned location of motors and gears, a space in the centre is thus free from motors and gears. Said space extends through the whole wrist housing along the first axis A through the wrist housing. A through duct 9 is arranged in said space. The duct is adapted to receive process cabling. The wrist housing further comprises a central opening adapted to allow the insertion of and the passage of said cabling. The wrist also comprises at least one opening adapted to allow the introduction and passage of said cabling out to the turn disc. Since the wrist is provided with two lugs, said cabling passes through the third axis with a minimum amount of tension.

The first motor in the example shown and the second motor are thus symmetrically arranged around a space arranged for centrally located cabling, in this case process cabling. One advantage is that such a wrist housing is easily accessible for service of the robot arm. The fact that the wrist housing comprises cabling, drive motors and gear means also means that this outer part of the robot arm in its entirety is simply removed and replaced by a new one without complicated adjustments of gear means having to be performed during assembly.

According to one embodiment of the invention, the motor of the first drive unit is arranged in the wrist housing in the manner shown in FIG. 1, that is, with its drive shaft perpendicular to the first axis. Torque transmission from the drive shaft of the motor to the rotatable torque transmission member of the wrist occurs via the first gear means. The first gear means is arranged on the primary side of the wrist housing. The drive shaft of the first motor is adapted to directly drive a gear wheel for the first gear means with a straight gear. Gear mechanism is utilized for transmitting torsional force. With a straight shaft, the size and weight of the robot arm are reduced compared with a different solution according to the prior art, where torque transmission from the motor is performed with a bevel wheel. Straight gears are easy to mount. In addition, with straight gears it is easier to achieve high precision in comparison with bevel gear pairs. The second motor drives the turn disc via the second gear means. The second gear means is arranged on the slave side of the wrist housing.

Figure 2:
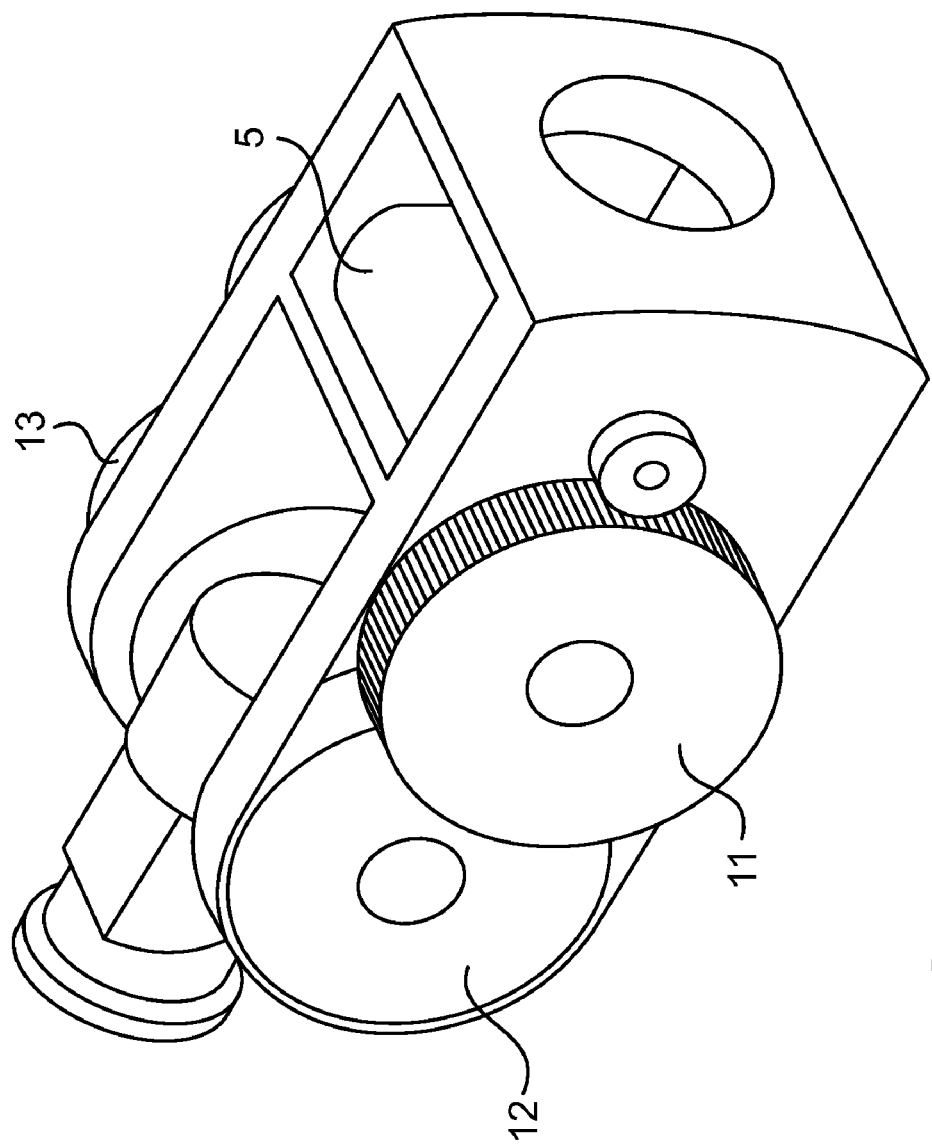
FIG. 2 is a perspective view of another embodiment according to the invention.

FIG. 2 shows a perspective view of an embodiment according to the invention of an outer part of a second robot arm comprising a wrist housing that supports a wrist. The figure shows driving ropes comprising gear wheels 11 or, alternatively, an intermediate gear 12.

Figure 3:
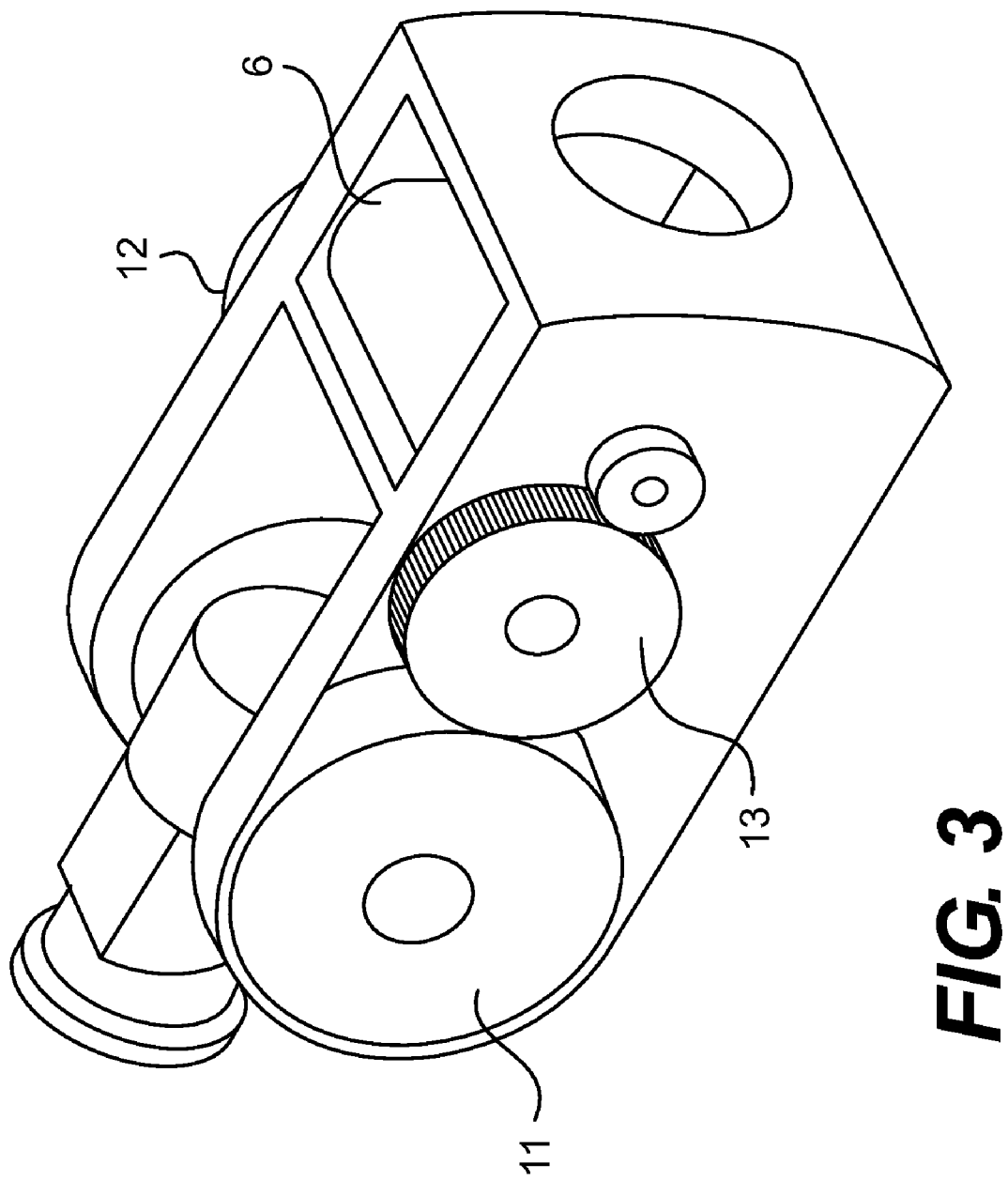
FIG. 3 is a perspective view of the embodiment according to the invention shown in FIG. 2, as viewed from the opposite side, and, FIG. 4 is a perspective view of an additional embodiment according to the invention.

FIG. 3 shows a perspective view of the wrist housing, shown above in FIG. 2, which supports a wrist viewed from the opposite side. The driving ropes shown comprise gear wheel 11 or, alternatively, intermediate wheel 13.

Figure 4:
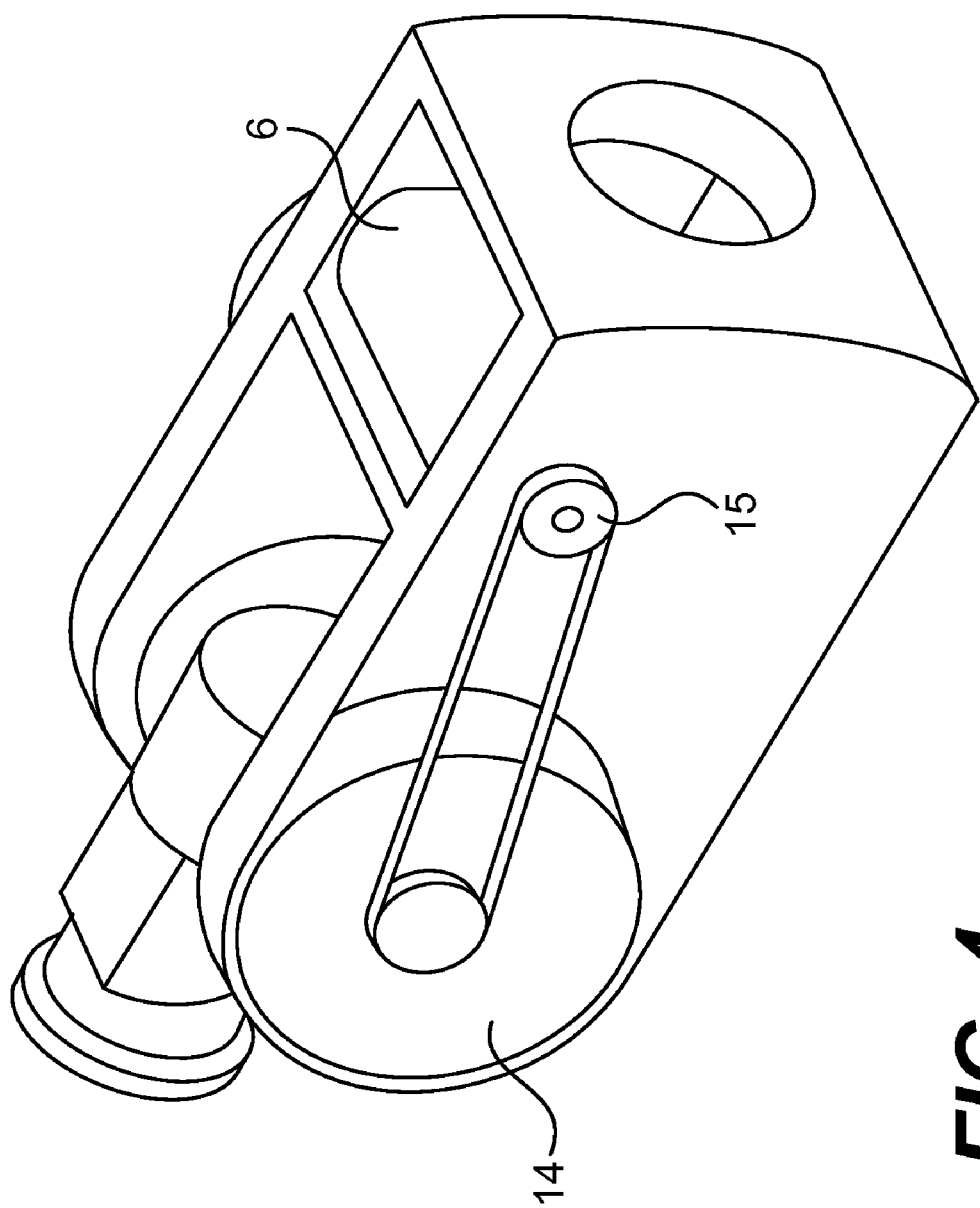

FIG. 4 shows a perspective view of an embodiment according to the invention of an outer part of a second robot arm comprising a wrist housing supporting a wrist. The driving ropes shown comprise a compact gear 14 and a cog belt [also called positive drive belt].

The outer part of the first robot arm shown in FIGS. 1, 2, 3 and 4 comprise wrist housings according to preferred embodiments of the invention, arranged to be connected, for example, to an industrial robot. An industrial robot with a robot arm according to the invention is not limited to six-axis industrial robots only but is intended to be utilized also in other types of industrial robots, such as Cartesian, anthropomorphic, polar, cylindrical robots or overhead travelling crane robots.

Also in other respects, the embodiments shown are to be regarded as non-limiting examples of the invention, which may be freely varied within the scope of the appended claims. Thus, different solutions to customer interface and suspension of the wrist and the turn disc may occur. Different detailed solutions may be chosen which arrange the drive of the wrist and the turn disc while at the same time reducing the dimensions thereof.

For example, the shape of the wrist housing may be adapted in dependence on the application of the industrial robot. Any kind of torque transmission member according to known or future technique may be used in connection with the invention. The gear ratio of the gear may also be changed. Also, it is possible to omit the toolholder, in which case the first motor directly drives a tool, such as a drill. Further, an industrial robot comprising a robot arm according to the invention may, of course, be provided with a larger as well as a smaller number of cooperating robot arms and also have a shape that differs from what has been described above.

In a further embodiment, compact gears are used and these are driven directly from a motor via a cog belt, which entails a saving in weight but also results in a wrist housing with a design with somewhat large dimensions than the preferred embodiment.

In yet another embodiment, the wrist comprises a central opening adapted to permit the introduction of and the passage of said cabling out to the turn disc.

The invention claimed is:

1. A robot arm for an industrial robot, said robot arm comprising:
   a wrist housing comprising a through duct coinciding with a center axis of the wrist housing for receiving process cabling,
   a wrist rotatably connected to the wrist housing,
   a turn disk rotatably connected to the wrist, wherein the turn disk is adapted for attachment of a tool to a tool holder,
   a first motor for driving the wrist,
   a second motor for driving the turn disk,
   a first drive line for transmitting rotation of the first motor to the wrist,
   a second drive line for transmitting rotation of the second motor to the turn disk, and
   a motor space within the wrist housing and surrounding the duct,
   wherein said first and second motors are arranged within the wrist housing in said motor space so that a drive shaft of the first motor and a drive shaft of the second motor are arranged spaced apart from a center axis of the wrist housing in opposite directions perpendicular to a longitudinal axis of the drive shaft of the first motor and a longitudinal axis of the drive shaft of the second motor, such that a space is formed in the wrist housing between the motors; and wherein the duct is arranged in said space.

2. The robot arm according to claim 1, wherein the drive shaft of said first motor and the drive shaft of said second motor are arranged in planes parallel to a center axis of the wrist housing.

3. The robot arm according to claim 1, wherein the drive shaft of said first motor and the drive shaft of said second motor form an angle relative to a center axis of the wrist housing.

4. The robot arm according to claim 1, wherein the drive shaft of said first motor and the drive shaft of said second motor are perpendicular to a center axis of the wrist housing.

5. The robot arm according to claim 1, wherein said first drive line and said second drive line comprise an intermediate gear.

6. The robot arm according to claim 1, wherein said first drive line and said second drive line comprise at least one gear wheel.

7. The robot arm according to claim 1, wherein said first drive line and said second drive line comprise an intermediate wheel.

8. The robot arm according to claim 1, wherein said first drive line and said second drive line comprise comprises a compact wheel and a cogged belt.

9. A method of manufacturing a robot arm for an industrial robot, said robot arm comprising a wrist housing, a wrist, and a turn disk, the wrist being rotatably connected to the wrist housing and the turn disk rotatably connected to the wrist, wherein the turn disk is adapted for attachment of a tool to a tool holder, a first motor for driving the wrist and a second motor for driving the turn disk, a first drive line for transmitting rotation of the first motor to the wrist, and a second drive line for transmitting rotation of the second motor to the turn disk, the method comprising:
   arranging in the wrist housing a through duct for receiving process cabling, wherein the duct coincides with a center axis of the wrist housing, and
   arranging a motor space within the wrist housing to surround the duct so that a drive shaft of the first motor and a drive shaft of the second motor are arranged spaced from the center axis of the wrist housing in opposite directions perpendicular to a longitudinal axis of the drive shaft of the first motor and a longitudinal axis of the drive shaft of the second motor, such that a space is formed in the wrist housing between the motors; wherein the duct is arranged in said space.

10. The method according to claim 9, wherein the drive shaft of said first motor and the drive shaft of said second motor are arranged in parallel planes.

11. The method according to claim 9, wherein the drive shaft of said first motor and the drive shaft of said second motor are arranged angularly adjusted relative to the center axis of the wrist housing.

12. The method according to claim 9, wherein the drive shaft of said first motor and the drive shaft of said second motor are arranged perpendicular to the center axis of the wrist housing.

13. The method according to claim 9, further comprising: utilizing the robot for a welding process.

14. The method according to claim 9, further comprising: utilizing the robot for a machining process.

15. The method according to claim 9, further comprising: utilizing the robot for a casting process.

16. The method according to claim 9, further comprising: utilizing the robot for a sorting process.

17. An industrial robot, comprising:
   a robot arm comprising a wrist housing comprising a through duct coinciding with a center axis of the wrist housing for receiving process cabling,
   a wrist rotatably connected to the wrist housing,
   a turn disk rotatably connected to the wrist, wherein the turn disk is adapted for attachment of a tool to a tool holder,
   a first motor for driving the wrist,
   a second motor for driving the turn disk,
   a first drive line for transmitting rotation of the first motor to the wrist,
   a second drive line for transmitting rotation of the second motor to the turn disk, and
   a motor space within the wrist housing and surrounding the duct,
   wherein said first and second motors are arranged within the wrist housing in said motor space so that a drive shaft of the first motor and a drive shaft of the second motor are arranged spaced apart from the center axis of the wrist housing in opposite directions perpendicular to a longitudinal axis of the drive shaft of the first motor and a longitudinal axis of the drive shaft of the second motor, such that a space is formed in the wrist housing between the motors, and wherein the duct is arranged in said space.

* * * * *